(12) United States Patent
Zhu et al.

(10) Patent No.: US 12,535,692 B2
(45) Date of Patent: Jan. 27, 2026

(54) DISPLAY PANEL AND DISPLAY APPARATUS

(71) Applicant: BOE Technology Group Co., Ltd., Beijing (CN)

(72) Inventors: Jinye Zhu, Beijing (CN); Lin Li, Beijing (CN); Fang Cheng, Beijing (CN); Pengxia Liang, Beijing (CN); Jing Yu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 320 days.

(21) Appl. No.: 18/282,216

(22) PCT Filed: Sep. 21, 2022

(86) PCT No.: PCT/CN2022/120077
§ 371 (c)(1),
(2) Date: Sep. 14, 2023

(87) PCT Pub. No.: WO2023/098240
PCT Pub. Date: Jun. 8, 2023

(65) Prior Publication Data
US 2024/0036351 A1    Feb. 1, 2024

(30) Foreign Application Priority Data

Nov. 30, 2021 (CN) .......................... 202111447347.7

(51) Int. Cl.
*G02B 30/27* (2020.01)
(52) U.S. Cl.
CPC .................................... *G02B 30/27* (2020.01)
(58) Field of Classification Search
CPC .............................................. G02B 30/00–60
(Continued)

(56) References Cited

U.S. PATENT DOCUMENTS 8,203,790 B2 *   6/2012   Booyens ................ B42D 25/45
                                                    359/619
2009/0146915 A1 *  6/2009  Marathe ................ G06F 3/1438
                                                    348/E7.083
(Continued)

FOREIGN PATENT DOCUMENTS

CN    110459577 A    11/2019
CN    110502202 A    11/2019
(Continued)

OTHER PUBLICATIONS

PCT/CN2022/120077 international search report.
PCT/CN2022/120077 Written Opinion.

*Primary Examiner* — Jessica M Merlin
(74) *Attorney, Agent, or Firm* — IPro, PLLC

(57) ABSTRACT

The present disclosure provides a display panel and a display apparatus. The display panel includes sub-pixel islands, the sub-pixel island includes a first small pixel island and a second small pixel island arranged along a first direction, and each of the small pixel islands includes at least two small pixel groups. The display panel further includes a first cylindrical lens and a second cylindrical lens arranged along the first direction. A distance between two small pixel groups in the first small pixel island is smaller than a distance between two small pixel groups in the second small pixel island, a radius of curvature of the first cylindrical lens is smaller than a radius of curvature of the second cylindrical lens, the first cylindrical lens and the second cylindrical lens are located at centers of the first small pixel island and the second small pixel island along the first direction respectively.

16 Claims, 10 Drawing Sheets

(58) Field of Classification Search
USPC .................................... 359/376–378; 349/15
See application file for complete search history.

(56) References Cited

U.S. PATENT DOCUMENTS

| | | | |
|---|---|---|---|
| 2017/0150131 A1* | 5/2017 | Van Putten | .......... H04N 13/305 |
| 2021/0057493 A1 | 2/2021 | Liu et al. | |
| 2021/0063737 A1* | 3/2021 | Ling | .................... G02B 27/123 |
| 2021/0215973 A1 | 7/2021 | Wang et al. | |
| 2021/0405371 A1* | 12/2021 | Yan | ........................... G06T 7/33 |
| 2022/0308349 A1 | 9/2022 | Yan et al. | |
| 2022/0311991 A1 | 9/2022 | Hong | |
| 2024/0036351 A1 | 2/2024 | Zhu et al. | |

FOREIGN PATENT DOCUMENTS

| | | |
|---|---|---|
| CN | 110632767 A | 12/2019 |
| CN | 111175982 A | 5/2020 |
| CN | 111971616 A | 11/2020 |
| CN | 112562515 A | 3/2021 |
| CN | 114114706 A | 3/2022 |

\* cited by examiner

DISPLAY PANEL AND DISPLAY APPARATUS

CROSS-REFERENCE TO RELATED APPLICATIONS

This application is a national stage of international PCT Application No. PCT/CN2022/120077 filed on Sep. 21, 2022, the entire contents of which are incorporated herein by reference.

TECHNICAL FIELD

The present disclosure relates to the field of display technology, and in particular, to a display panel and a display apparatus.

BACKGROUND

Naked-eye 3D display technology is also referred to as "naked-eye multi-view" technology, which is a technology that allows people to have a stereoscopic visual effect without aid of auxiliary tools. At present, super multi-view (SMV) 3D display technology is becoming a main stream of the naked-eye 3D display. A principle thereof is, for a multi-view image with a same scenario or object, to fuse the multi-view image into a stereoscopic image at last by extending a regular auto-stereoscopic display method. This technology can increase a number of viewpoints as many as possible within a single pupil of a human eye, which supports monocular focusing, satisfies a perception mechanism of a human eye, can relieve visual fatigue to some extent, and can provide a smoother stereoscopic parallax image and a wider observation range.

However, there are a series of problems for the super multi-view (SMV) 3D display technology: (1) with more viewpoints, a resolution loss is greater, while a display panel requires a sufficient resolution; (2) a wide view is expected for multi-person viewing and mobile viewing, but due to limited light-condensing capacity of a cylindrical lens array, light in a large viewing angle at an edge cannot be collimated, causing a great optical crosstalk between adjacent viewpoints, thus the large viewing angle cannot be achieved; (3) when a large-size screen is applied to, light in the large viewing angle at the edge is more affected by factors such as lens aberration, thus the light in the large viewing angle has a greater crosstalk; (4) at present, a large viewing angle is usually spliced by a main lobe and a side lobe, and there is a dead area between the main lobe and the side lobe, thus a large main lobe angle is required to achieve the large viewing angle to avoid the dead area.

SUMMARY

The present disclosure provides a display panel and a display apparatus, where the display panel is convenient for increasing a viewing angle, and can reach a large viewing angle for a main lobe, and stereoscopic images can be continuously watched in the viewing angle of the main lobe without dead areas, so that the display panel is suitable for watching by multiple persons at a same time.

According to a first aspect of embodiments of the present disclosure, a display panel is provided. The display panel includes a pixel array layer and a lens array layer arranged in a stacked manner, the pixel array layer includes sub-pixel islands, the sub-pixel island includes at least two small pixel islands arranged along a first direction in sequence, the at least two small pixel islands include a first small pixel island and a second small pixel island, and each of the first small pixel island and the second small pixel island includes at least two small pixel groups; the lens array layer includes a first cylindrical lens and a second cylindrical lens arranged along the first direction, the first cylindrical lens corresponds to the first small pixel island, and the second cylindrical lens corresponds to the second small pixel island; a distance between two small pixel groups in the first small pixel island is smaller than a distance between two small pixel groups in the second small pixel island, a focal length of the first cylindrical lens is smaller than a focal length of the second cylindrical lens, the first cylindrical lens is arranged near a center of the first small pixel island along the first direction, the two small pixel groups in the first small pixel island form a first visual area through the first cylindrical lens; the second cylindrical lens is arranged near a center of the second small pixel island along the first direction, the two small pixel groups in the second small pixel island form a second visual area through the second cylindrical lens, the second visual area includes two parts corresponding to the two small pixel groups in the second small pixel island respectively, the two parts of the second visual area are located at different sides of the first visual area along the first direction respectively.

In an embodiment, each of the small pixel islands includes two small pixel groups, the two small pixel groups are symmetrically distributed relative to a center of the small pixel island along the first direction.

In an embodiment, the sub-pixel island further includes a third small pixel island, the third small pixel island includes two small pixel groups, and the first small pixel island, the second small pixel island and the third small pixel island are arranged along the first direction in sequence; the lens array layer further includes a third cylindrical lens, the third cylindrical lens corresponds to the third small pixel island, and the first cylindrical lens, the second cylindrical lens and the third cylindrical lens are arranged along the first direction in sequence; the distance between the two small pixel groups in the second small pixel island is smaller than a distance between two small pixel groups in the third small pixel island, the focal length of the second cylindrical lens is smaller than a focal length of the third cylindrical lens, the third cylindrical lens is arranged near a center of the third small pixel island along the first direction, the two small pixel groups in the third small pixel island form a third visual area through the third cylindrical lens, the third visual area includes two parts corresponding to the two small pixel groups in the third small pixel island respectively, and the two parts of the third visual area are located at different sides of the second visual area along the first direction respectively.

In an embodiment, the first cylindrical lens, the second cylindrical lens and the third cylindrical lens share a same material, a radius of curvature of the first cylindrical lens is smaller than a radius of curvature of the second cylindrical lens, and the radius of curvature of the second cylindrical lens is smaller than a radius of curvature of the third cylindrical lens.

In an embodiment, an arch height $H_1$ of the first cylindrical lens, an arch height $H_2$ of the second cylindrical lens, and an arch height $H_3$ of the third cylindrical lens satisfy: $H_1 > H_2 > H_3$.

In an embodiment, the first cylindrical lens, the second cylindrical lens and the third cylindrical lens have a same lens aperture.

In an embodiment, an optical crosstalk between adjacent viewpoints of the first small pixel island, the second small pixel island and the third small pixel island ≤10%.

In an embodiment, the pixel array layer includes pixel islands, each of the pixel islands includes the sub-pixel islands arranged along a second direction, the sub-pixel islands include an R sub-pixel island for emitting red light, a G sub-pixel island for emitting green light, and a B sub-pixel island for emitting blue light; sub-pixels in a sub-pixel island emit light of a same color.

In an embodiment, two R sub-pixel islands, two G sub-pixel islands and two B sub-pixel islands are arranged in a pixel island, where two sub-pixel islands with a same color are adjacently arranged along the second direction; each of the sub-pixel islands includes sub-pixels and interval areas between adjacent sub-pixels; in two adjacent sub-pixel islands with a same color, projections of sub-pixels in a sub-pixel island along the second direction correspondingly overlap with projections of interval areas in another sub-pixel island along the second direction.

In an embodiment, a distance between two adjacent sub-pixel islands along the second direction is 2 μm-10 μm.

In an embodiment, each of the small pixel islands includes pixel distributing areas and isolation areas, and no sub-pixel is set within the isolation areas; in a sub-pixel island, respective isolation areas in any one small pixel island are correspondingly filled by respective pixel distributing areas in other small pixel islands.

In an embodiment, a distance between adjacent sub-pixels in the respective small pixel groups in the first small pixel island is equal to a distance between the two small pixel groups in the first small pixel island.

In an embodiment, the two small pixel groups in the first small pixel island are arranged at a center of the small pixel island along the first direction.

In an embodiment, a distance between adjacent sub-pixels in the respective small pixel groups in the first small pixel island is equal to a distance between the two small pixel groups in the first small pixel island.

In an embodiment, a width of respective sub-pixel in the respective small pixel groups ranges from 5 μm to 0.9 mm.

According to a second aspect of embodiments of the present disclosure, a display apparatus is provided, where the display apparatus includes the display panel as defined above.

A main technical effect to be achieved by embodiments of the present disclosure includes: according to the display panel and the display apparatus provided by the embodiments of the present disclosure, each of the sub-pixel islands is divided into (at least two) small pixel islands arranged along the first direction, and a center of any one small pixel island along the first direction corresponds to a cylindrical lens with different parameters, different visual areas are formed by respective small pixel islands through corresponding cylindrical lenses, and consequently a larger main lobe viewing angle is achieved by splicing viewing angles of the small pixel islands. According to a design of the above sub-pixel islands, it is quite convenient to adjust a number of small pixel islands in a sub-pixel island according to application scenario or user requirement. The more a number of the small pixel islands in a sub-pixel island is, the more areas of spliced viewing angles are, and the larger the viewing angle of the main lobe can be achieved. Stereoscopic images can be continuously watched in the viewing angle of the main lobe, which avoids the dead area, and is suitable for multi-person viewing.

BRIEF DESCRIPTION OF DRAWINGS

FIG. 3A, FIG. 3B and FIG. 3C are effect diagrams of visual areas corresponding to respective small pixels of a same sub-pixel island.

FIG. 5A is a schematic design diagram of sub-pixels in a central small pixel island, FIG. 5B is a schematic design diagram of sub-pixels in a sub-central small pixel island, and FIG. 5C is a schematic design diagram of sub-pixels in a marginal small pixel island.

Figure 1:
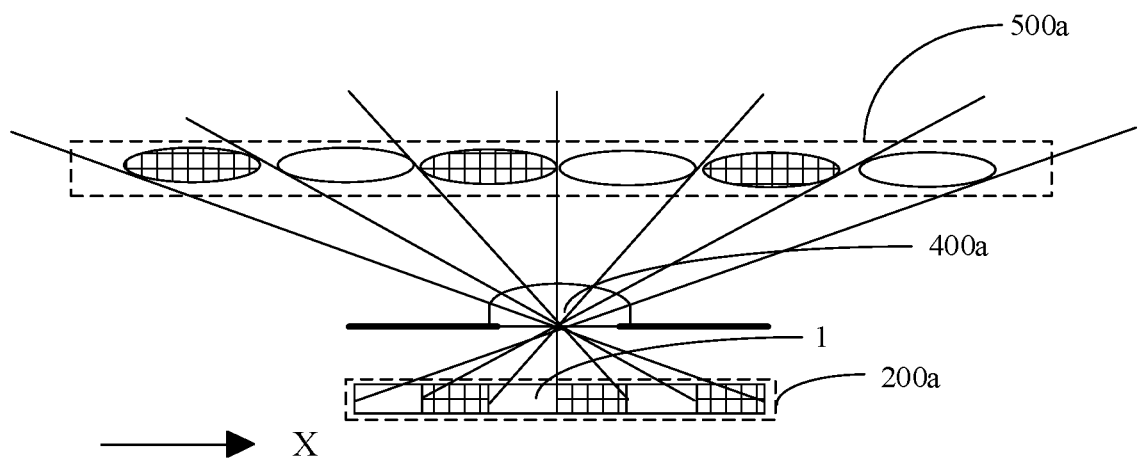
FIG. 1 is a pixel structure arrangement design diagram for achieving naked-eye 3D effect based on a super multi-view (SMV) technology at present.

Reference numerals: 1, sub-pixel; 100, pixel island; 101, R sub-pixel island; 102, G sub-pixel island; 103, B sub-pixel island; 200, sub-pixel island; 201, first small pixel island; 202, second small pixel island; 203, third small pixel island; 201a, first central small pixel group; 201b, second central small pixel group; 202a, first sub-central small pixel group; 202b, second sub-central small pixel group; 203a, first marginal small pixel group; 203b, second marginal small pixel group; 301, first pixel group; 302, second pixel group; 303, third pixel group; 400, cylindrical lens; 401, first cylindrical lens; 402, second cylindrical lens; 403, third cylindrical lens; 500, visual area; 501, first visual area; 502, second visual area; 503, third visual area; 501a, first central small island visual area; 501b, second central small island visual area; 502a, first sub-central small island visual area; 502b, second sub-central small island visual area; 503a, first marginal small island visual area; 503b, second marginal small island visual area; S, viewing distance; θ, single-point viewing angle; Z, viewing angle of main lobe; M, number of viewpoints.

DETAILED DESCRIPTION

Description will now be made in detail to illustrative embodiments, examples of which are shown in the accompanying drawings. When the following description refers to the drawings, unless otherwise indicated, same reference numerals in different drawings indicate the same or similar elements. Embodiments described in the following illustrative embodiments do not represent all embodiments consistent with the present disclosure. In contrary, they are merely examples of apparatuses and methods consistent with some aspects of the present disclosure as described in detail in the appended claims.

The terminologies used in the present disclosure are for the purpose of describing specific embodiments only and are not intended to limit the present disclosure. Singular forms "a", "the" and "said" used in the present disclosure and the appended claims are also intended to include plural forms, unless the context clearly indicates other meaning. It should also be understood that the term "and/or" as used herein refers to and includes any or all possible combinations of one or more associated listed items.

Super multi-view (SMV) 3D display technology satisfies a deep perception mechanism of a human eye, which can achieve displaying with large viewing angle and multi-view, and has an auto-stereoscopic display effect with more than 9 viewpoints, and can greatly reduce visual fatigue of human. However, such technology has a problem of large optical crosstalk between adjacent viewpoints caused by large resolution loss, and a problem of dead area presented between a main lobe and a side lobe for splicing a large viewing angle, etc.

Figure 6:
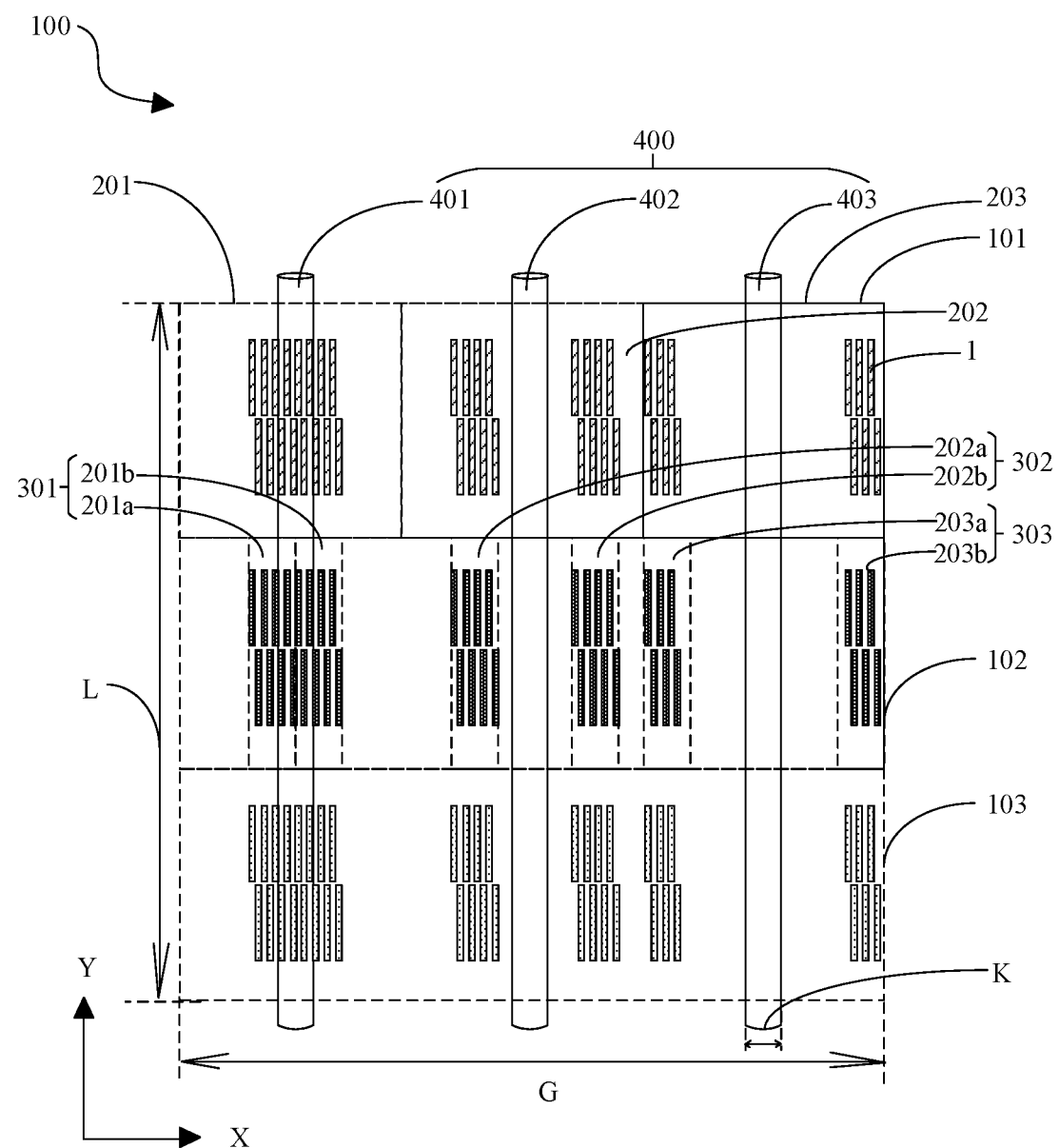
FIG. 6 is a schematic structural design diagram of small pixel islands according to an embodiment of the present disclosure.

To solve the above problems, the present disclosure provides a display panel, where the display panel includes a pixel array layer (not shown) and a lens array layer (not shown) arranged in a stacked manner. The pixel array layer includes pixel islands arranged in an array, and each of the pixel islands includes an R sub-pixel island, a G sub-pixel island and a B sub-pixel island arranged along a second direction (a column direction, i.e., Y direction as shown in FIG. 6). The R sub-pixel island is consisted of R sub-pixels for emitting red light, the G sub-pixel island is consisted of G sub-pixels for emitting green light, and the B sub-pixel island is consisted of B sub-pixels for emitting blue light.

The R sub-pixel island includes a first small pixel island (first pixel island) and a second small pixel island (second pixel island) arranged along a first direction (a row direction, i.e., X direction as shown in FIG. 6) in sequence. Two small pixel islands are illustrated herein, but in practical application, a number of small pixel islands in the R sub-pixel island can be set as two, three, four or more according to requirements. Each of the G sub-pixel island and the B sub-pixel island includes a first small pixel island and a second small pixel island arranged along the first direction (the row direction, i.e., X direction as shown in FIG. 6) in sequence. Similarly, in practical application, a number of small pixel islands in the G sub-pixel island or the B sub-pixel island can be set as two, three, four or more according to requirements. Generally speaking, the more a number of divided areas are (that is, the more a number of small pixel islands in a sub-pixel island is set), the more areas of spliced viewing angles are, and the larger the viewing angle of the main lobe can be achieved.

Each of the small pixel islands is provided with a pixel group consisting of sub-pixels, and the pixel group can be divided into two small pixel groups, and the two small pixel groups are entirely located at different sides of a corresponding cylindrical lens respectively. That is, each of the first small pixel island and the second small pixel island includes two small pixel groups, and the two small pixel groups are symmetrically distributed or basically symmetrically distributed relative to a center of the small pixel island along the first direction (the row direction, i.e., X direction as shown in FIG. 6). A distance between the two small pixel groups in the first small pixel island is smaller than a distance between the two small pixel groups in the second small pixel island.

The lens array layer includes cylindrical lenses arranged along the first direction (the row direction, i.e., X direction as shown in FIG. 6), the cylindrical lenses include a first cylindrical lens and a second cylindrical lens, the first cylindrical lens corresponds to the first small pixel island, and the second cylindrical lens corresponds to the second small pixel island. Each of the small pixel islands in a sub-pixel island has a corresponding cylindrical lens.

A radius of curvature R1 of the first cylindrical lens is smaller than a radius of curvature R2 of the second cylindrical lens, the first cylindrical lens is arranged at a center of the first small pixel island along the first direction (the row direction, i.e., X direction as shown in FIG. 6), the two small pixel groups in the first small pixel island form a first visual area through the first cylindrical lens; the second cylindrical lens is arranged at a center of the second small pixel island along the first direction (the row direction, i.e., X direction as shown in FIG. 6), the two small pixel groups in the second small pixel island form a second visual area through the second cylindrical lens, the second visual area includes two parts corresponding to the two small pixel groups in the second small pixel island respectively, the two parts of the second visual area are located at different sides of the first visual area along the first direction (the row direction, i.e., X direction as shown in FIG. 6) respectively.

In a pixel structure formed based on a present super multi-view (SMV) technology process, a pixel island (or a sub-pixel island) corresponds to a cylindrical lens. After respective sub-pixels in the pixel island pass through a cylindrical lens with a radius of R, sub-pixels at center form small-size light spots, and sub-pixels at margin form large-size spot lights. In an embodiment of the present disclosure, by setting (at least two) corresponding cylindrical lenses for a single sub-pixel, and designing uneven focal lengths for respective cylindrical lenses, light spots formed by sub-pixels at center have large sizes, so as to increase a viewing angle formed by the sub-pixels.

Two solutions can be adopted for designing uneven focal lengths for respective cylindrical lenses in a single pixel island. In an embodiment, when the cylindrical lenses have a same material, that is, the cylindrical lenses have a same refractive index, radius of curvature R of the cylindrical lenses can be changed to make different small pixel islands correspond to cylindrical lenses with different radius of curvature R.

In an embodiment, when the cylindrical lenses have different materials, that is, the cylindrical lenses have different refractive indexes, it can be set that different small pixel islands correspond to cylindrical lenses with a same radius of curvature R. That is, for cylindrical lenses with a same radius of curvature, the refractive rate of the cylindrical lenses can be set to adjust focal lengths of the cylindrical lenses.

Cylindrical lenses with a same material are adopted in an embodiment of the present disclosure, and radiuses of curvature R of the cylindrical lenses are changed to increase the viewing angle formed by the sub-pixels. A radius of curvature R of a cylindrical lens is determined by a focal length of the cylindrical lens. When a refractive index is constant, the focal length increases as the radius R of the cylindrical lens increases.

Specifically, a radius of curvature R of a cylindrical lens is determined by a distance from a sub-pixel in a corresponding small pixel island to a center of the small pixel island (that is, where the cylindrical lens locates). The farther the distance from the sub-pixel in the small pixel island corresponding to the cylindrical lens to the center of the small pixel island is, the greater the focal length of the cylindrical lens is, the greater the radius of curvature of the cylindrical lens is. Specifically, a distance between the two small pixel groups in the first small pixel island is smaller than a distance between the two small pixel groups in the second small pixel island, thus a distance from a sub-pixel corresponding to the two small pixel groups in the first small pixel island to a center of the first small pixel island is smaller than a distance from a sub-pixel corresponding to the two small pixel groups in the second small pixel island to the center of the second small pixel island. Thus, a radius of curvature R1 of the first cylindrical lens is smaller than a radius of curvature R2 of the second cylindrical lens.

An arch height of a cylindrical lens is determined by a distance from a sub-pixel in a corresponding small pixel island to a center of the small pixel island. The farther the distance from the sub-pixel in the small pixel island corresponding to the cylindrical lens to the center of the small pixel island is, the smaller the arch height of the cylindrical lens is. As can be known, an arch height H1 of the first cylindrical lens is greater than an arch height H2 of the second cylindrical lens.

Each of the small pixel islands may include (at least two) sub-pixel rows arranged along the second direction. Correspondingly, each of the small pixel groups can be divided into multiple rows of the small pixel group along the second direction (the column direction, i.e., Y direction as shown in FIG. 6), any of the small pixel groups can be divided into a first row of the small pixel group, a second row of the small pixel group, a third row of the small pixel group, . . . , an n-th row of the small pixel group along the second direction (the column direction, i.e., Y direction as shown in FIG. 6). Preferentially, a small pixel group can be divided into two rows along the second direction (the column direction, i.e., Y direction as shown in FIG. 6).

According to requirements of a viewing angle, the sub-pixel islands (the R sub-pixel island, the G sub-pixel island or the B sub-pixel island) can also be divided into areas in any way, can be divided into any number of small pixel islands arranged along the first direction (the row direction, i.e., X direction shown in FIG. 6), and correspondingly, a number of small pixel groups, a number of cylindrical lenses, a radius of curvature of a cylindrical lens, an arch height of a cylindrical lens, etc., will vary according to the division, and a varying rule thereof follows an arrangement rule thereof. Compared to the present super multi-view (SMV) technology, the pixel island division manner can greatly increase the viewing angle and achieve a large main-lobe viewing angles.

In a regular design of the present super multi-view (SMV) technology, the cylindrical lenses and the sub-pixel islands are evenly arranged, and one sub-pixel island corresponds to one cylindrical lens, the cylindrical lens is located exactly over a center of the sub-pixel island along the first direction (the row direction, i.e., X direction shown in FIG. 6). When a width of a sub-pixel is designed as 6.5 µm, an extreme design for a maximum viewing angle is performed. The design is: an arch height of a cylindrical lens is controlled to satisfy an existing process limit of ≥2 µm, a width of the cylindrical lens is 377.1 µm, an aperture of the cylindrical lens is 64.99 µm, a radius of curvature of the cylindrical lens is 270 µm, an arch height is 1.96 µm, a refractive index of the cylindrical lens is 1.61, the width of the sub-pixel is 6.5 µm, a placement height is 600 µm, and at this time, the cylindrical lens can achieve a viewing angle of 53° at most.

According to the pixel island division design of the present disclosure, when the width of the sub-pixel is 6.5 µm, the arch height of the cylindrical lens, the width of the cylindrical lens, the aperture of the cylindrical lens, the refractive index of the cylindrical lens and the placement height are all same as those in a regular design. At this time, one sub-pixel island corresponding to one cylindrical lens in the regular design is changed to one sub-pixel island corresponding to three cylindrical lenses, and radiuses of curvature and arch heights of the three cylindrical lenses are different. At the same time, a focal length of the cylindrical lens is changed relative to that in the regular design, and a maximum viewing angle that can be achieved through the lens is changed to a viewing angle of 88° (main lobe angle), and an effect is increased by 35°.

FIG. 1 is a pixel structure arrangement design diagram for achieving naked-eye 3D effect based on a super multi-view (SMV) technology at present. As can be known in FIG. 1, a pixel arrangement structure includes a sub-pixel island 200a and a cylindrical lens 400a. The sub-pixel island 200a includes six sub-pixels 1, and the sub-pixels 1 form corresponding visual areas through the same cylindrical lens 400a, and the respective visual areas are spliced together to form a visual area 500a corresponding to the sub-pixel island 200a. As shown in FIG. 1, to distinguish boundaries of the sub-pixels 1, adjacent sub-pixels 1 are filled with different patterns, which does not indicate that the adjacent sub-pixels 1 are of different types. In practical application, the adjacent sub-pixels 1 may emit light of a same color. In addition, there are spaces between adjacent sub-pixels 1, which are not shown in the figure.

Figure 2:
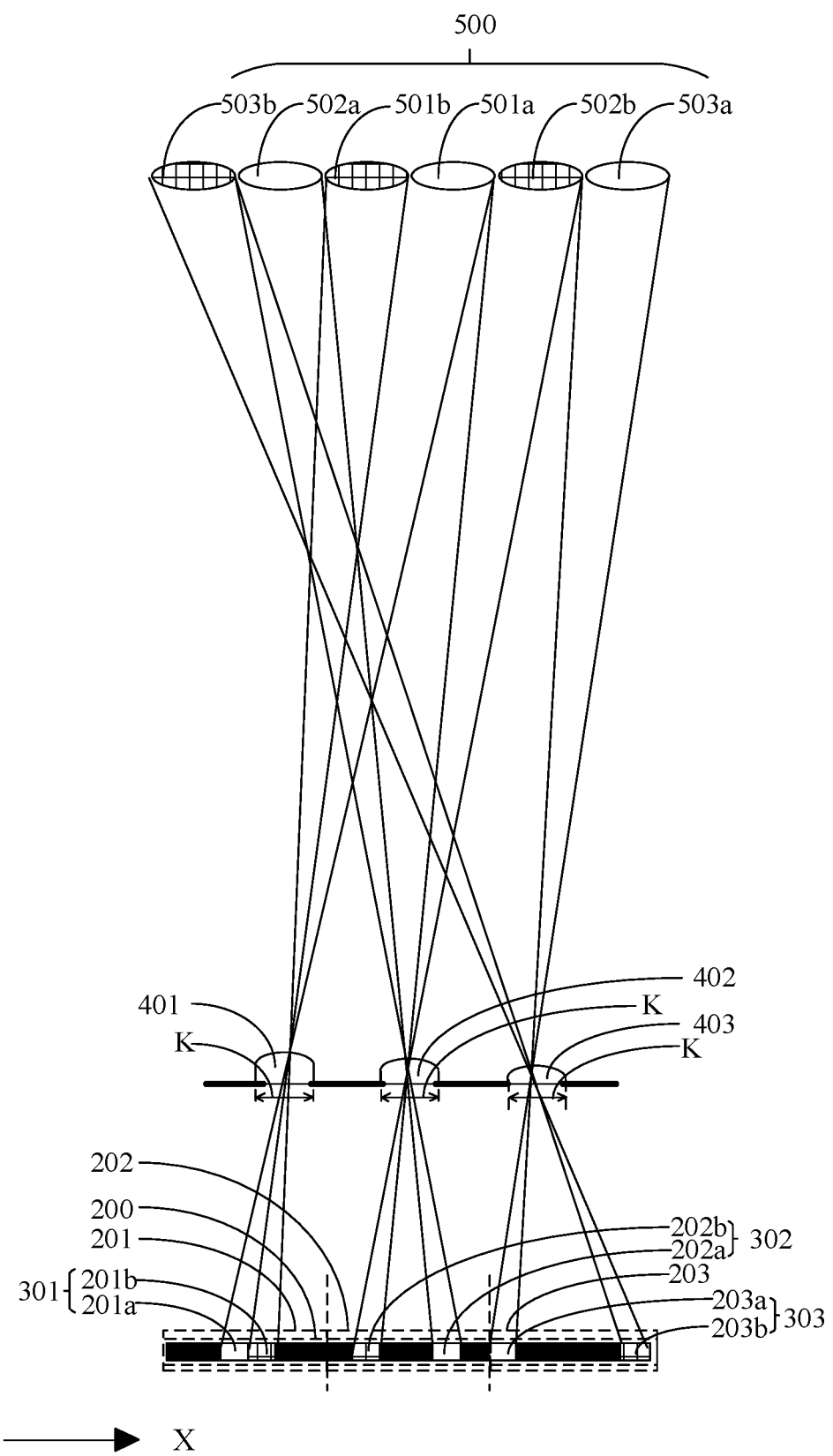
FIG. 2 is a principle diagram showing splicing of visual areas of small pixel islands according to an embodiment of the present disclosure.

FIG. 2 is a principle diagram showing splicing of visual areas of small pixel islands when a sub-pixel island of a display panel is divided into three small pixel islands along the first direction (X direction) according to an embodiment of the present disclosure. The sub-pixel island shown in FIG. 2 is obtained by placing small pixel islands in FIG. 3A, FIG. 3B and FIG. 3C side by side along the first direction (X direction). As can be known from FIG. 2, FIG. 3A, FIG. 3B and FIG. 3C, the sub-pixel island is divided into a first small pixel island 201, a second small pixel island 202 and a third small pixel island 203, where respective sub-pixels in the first small pixel island 201 are at center of the first small pixel island 201, respective sub-pixels in the second small pixel island 202 are at sub-center of the second small pixel island 202, respective sub-pixels in the third small pixel island 203 are at margin of the third small pixel island 203.

The cylindrical lens includes a first cylindrical lens 401, a second cylindrical lens 402 and a third cylindrical lens 403. The first cylindrical lens 401 is located at center of the first small pixel island 201 along the first direction (X direction), of which a radius of curvature is R1, an arch height is H1; the second cylindrical lens 402 is located at center of the second small pixel island 202 along the first direction (X direction), of which a radius of curvature is R2, an arch height is H2; the third cylindrical lens 403 is located at center of the third small pixel island 203 along the first direction (X direction), of which a radius of curvature is R3, an arch height is H3. The radiuses of curvature R1, R2 and R3 are different, the arch heights H1, H2 and H3 are also different. But lens apertures K of the first cylindrical lens 401, the second cylindrical lens 402 and the third cylindrical lens 403 are same.

By placing the first small pixel island 201, the second small pixel island 202 and the third small pixel island 203 side by side along the first direction (X direction), a spliced sub-pixel island 200 is obtained. The first small pixel island 201 forms a first visual area 501 through the first cylindrical lens 401, the second small pixel island 202 forms a second visual area 502 through the second cylindrical lens 402, and the third small pixel island 203 forms a third visual area 503 through the third cylindrical lens 403. Since the first small pixel island 201, the second small pixel island 202 and the third small pixel island 203 are placed side by side along the first direction (X direction), the first visual area 501, the second visual area 502 and the third visual area 503 formed thereby are spliced along the first direction (X direction) to form a visual area 500.

A distance between two small pixel groups 201a and 201b in the first small pixel island 201 is smaller than a distance between two small pixel groups 202a and 202b in the second small pixel island 202, and the distance between the two small pixel groups 202a and 202b in the second small pixel island 202 is smaller than a distance between two small pixel groups 203a and 203b in the third small pixel island 203. Thus, a distance from a sub-pixel corresponding to the two small pixel groups 201a and 201b in the first small pixel island 201 to a center (the first cylindrical lens 401) of the first small pixel island 201 along the first direction (X direction) is smaller than a distance from a sub-pixel corresponding to the two small pixel groups 202a and 202b in the second small pixel island 202 to a center (the second cylindrical lens 402) of the second small pixel island 202 along the first direction (X direction); and a distance from a sub-pixel corresponding to the two small pixel groups 202a and 202b in the second small pixel island 202 to a center (the second cylindrical lens 402) of the second small pixel island 202 along the first direction (X direction) is smaller than a distance from a sub-pixel corresponding to the two small pixel groups 203a and 203b in the third small pixel island 203 to a center (the third cylindrical lens 403) of the third small pixel island 203 along the first direction (X direction). Correspondingly, to form the visual area 500 as shown in the figure, the first cylindrical lens 401, the second cylindrical lens 402 and the third cylindrical lens 403 can be configured, such that the radius of curvature R1 of the first cylindrical lens 401, the radius of curvature R2 of the second cylindrical lens 402 and the radius of curvature R3 of the third cylindrical lens 403 satisfy: R1<R2<R3.

An arch height of a cylindrical lens is determined by a distance from a sub-pixel in a corresponding small pixel island to a center (where the cylindrical lens locates) of the small pixel island. The farther the distance from the sub-pixel in the small pixel island corresponding to the cylindrical lens to the center of the small pixel island is, the smaller the arch height of the cylindrical lens is. As can be known, arch heights of the first cylindrical lens 401, the second cylindrical lens 402 and the third cylindrical lens 403 satisfy: H1>H2>H3.

Figure 5A:
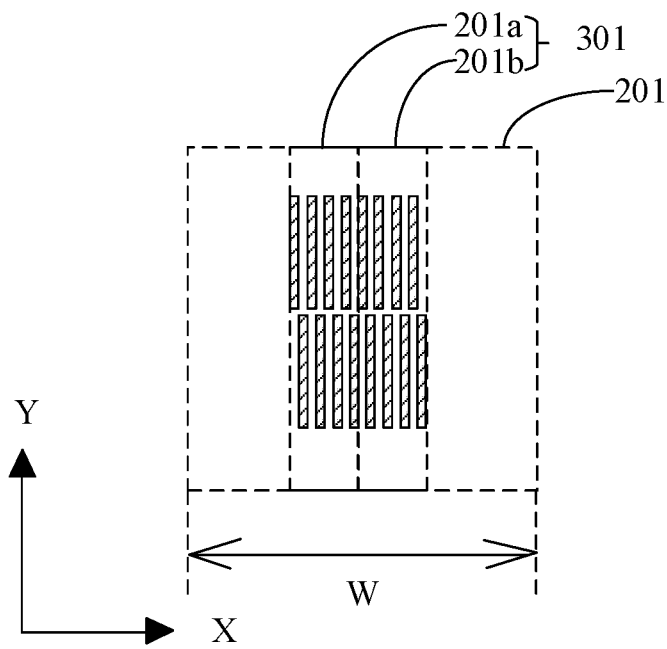
FIG. 5A, FIG. 5B and FIG. 5C are schematic design diagrams of sub-pixels in small pixel islands according to an embodiment of the present disclosure, where

It shall be noted that: a distance between adjacent sub-pixels in the respective small pixel groups 201a and 201b in the first small pixel island 201 is equal to a distance between the two small pixel groups 201a and 201b in the first small pixel island, as shown in FIG. 5A and FIG. 6. In such way, the small pixel group 201a and the small pixel group 201b cannot be distinguished or divided as simple as for the second small pixel island 202 (or the third small pixel island 203). At this time, the small pixel groups 201a and 201b can be divided by taking a center or a central line of the first small pixel island 201 as a boundary. However, it is not limited by the present disclosure.

Figure 3A:
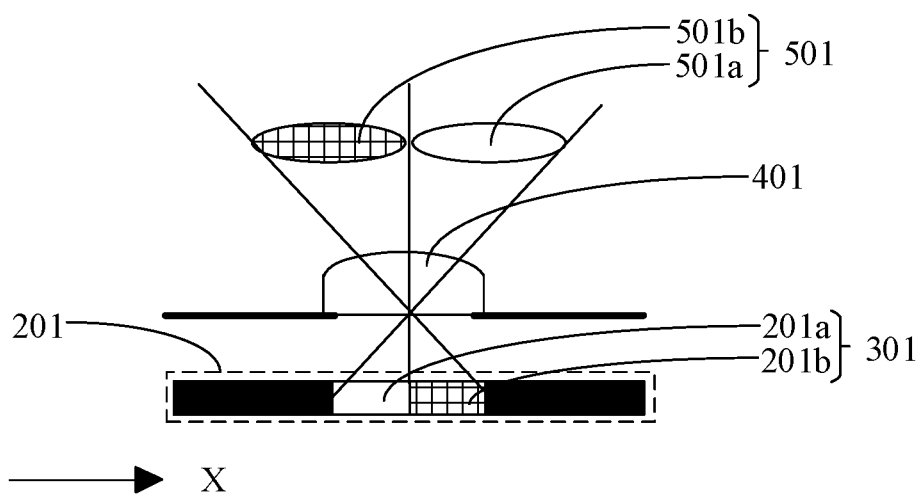
FIG. 3A, FIG. 3B and FIG. 3C are diagrams of sub-pixel island segmentation, where
Figure 3B:
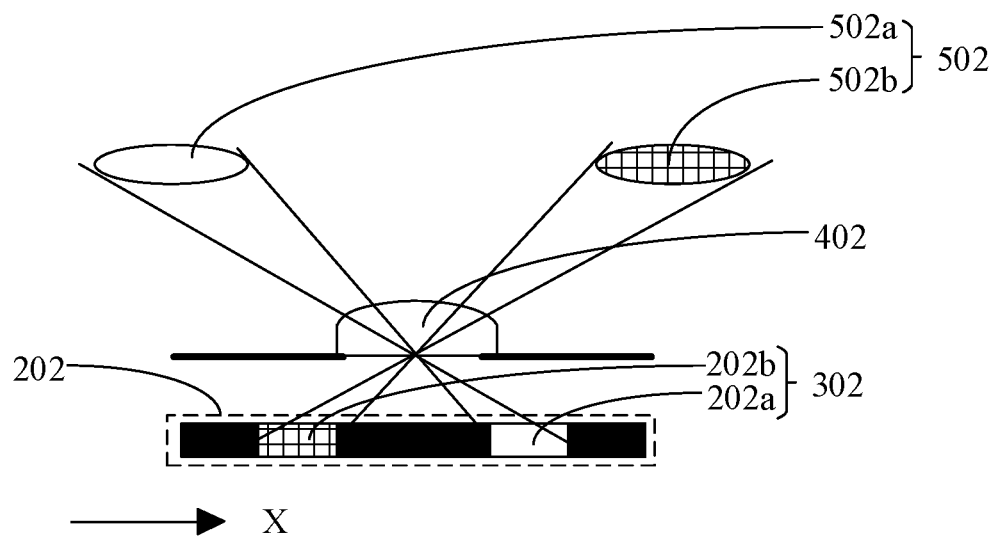
Figure 3C:
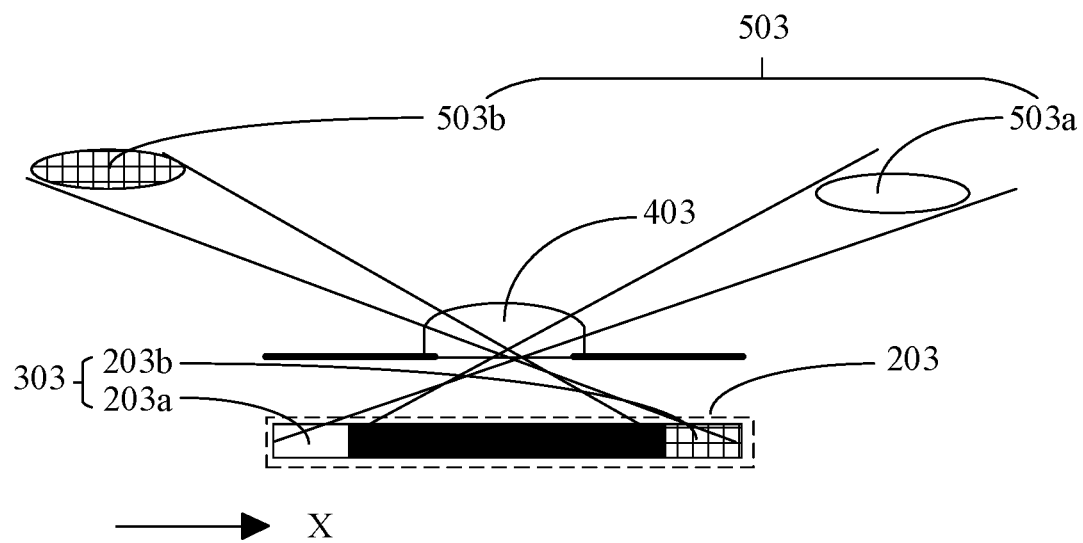

In the following, detailed description about spliced first visual area 501, second visual area 502 and third visual area 503 as shown in FIG. 3A, FIG. 3B and FIG. 3C with reference to FIG. 2.

The first small pixel island 201 is provided with a first pixel group 301 including sub-pixels, the second small pixel island 202 is provided with a second pixel group 302 including sub-pixels, and the third small pixel island 203 is provided with a third pixel group 303 including sub-pixels.

The first small pixel island 201 includes a first central small pixel group 201a and a second central small pixel group 201b, and the first central small pixel group 201a and the second central small pixel group 201b together form the first pixel group 301, and the first central small pixel group 201a forms a corresponding first central small island visual area 501a through the first cylindrical lens 401, and the second central small pixel group 201b forms a corresponding second central small island visual area 501b through the first cylindrical lens 401.

The second small pixel island 202 includes a first sub-central small pixel group 202a and a second sub-central small pixel group 202b, and the first sub-central small pixel group 202a and the second sub-central small pixel group 202b together form the second pixel group 302, and the first sub-central small pixel group 202a forms a corresponding first sub-central small island visual area 502a through the second cylindrical lens 402, and the second sub-central small pixel group 202b forms a corresponding second sub-central small island visual area 502b through the second cylindrical lens 402.

The third small pixel island 203 includes a first marginal small pixel group 203a and a second marginal small pixel group 203b, and the first marginal small pixel group 203a and the second marginal small pixel group 203b together form the third pixel group 303, and the first marginal small pixel group 203a forms a corresponding first marginal small island visual area 503a through the third cylindrical lens 403, and the second marginal small pixel group 203b forms a corresponding second marginal small island visual area 503b through the third cylindrical lens 403.

The first central small island visual area 501a and the second central small island visual area 501b form a first visual area 501, where the first visual area 501 is also referred to as a central visual area; the first sub-central small island visual area 502a and the second sub-central small island visual area 502b form a second visual area 502, where the second visual area 502 is also referred to as a sub-central visual area; the first marginal small island visual area 503a and the second marginal small island visual area 503b form a third visual area 503, where the third visual area 503 is also referred to as a marginal visual area.

From the above, by placing the first small pixel island 201, the second small pixel island 202 and the third small pixel island 203 side by side along the first direction (X direction), the first visual area 501, the second visual area 502 and the third visual area 503 are spliced along the first direction (X direction) to form the visual area 500.

In related arts, as shown in FIG. 1, a regular visual area 500a formed by the sub-pixel island 200a has a lobe-to-lobe dead area, which will affect viewer experience and bring a large optical crosstalk. In the embodiments of the present disclosure, the sub-pixel island 200 is divided into the first small pixel island 201, the second small pixel island 202 and the third small pixel island 203, and the visual area 500 spliced thereby is a large main lobe angle, as shown in FIG. 2, so that the optical crosstalk between visual areas formed by sub-pixels 1 as shown in FIG. 1 is effectively reduced, and at the same time, the dead area is avoided.

In an embodiment of a 110-inch Mini LED display, according to a current process limitation, a width of a sub-pixel is set as 6.9 μm, a watching distance is set as 4 m, a placement height of a lens is set as 637 µm, a refractive index of the lens is set as 1.61, a light spot of a single viewpoint is set as 65 mm. Based on the above design, an angle of a single viewpoint provided by a single sub-pixel is 0.93°, and division of the sub-pixel island is designed according to the above parameters.

Figure 4:
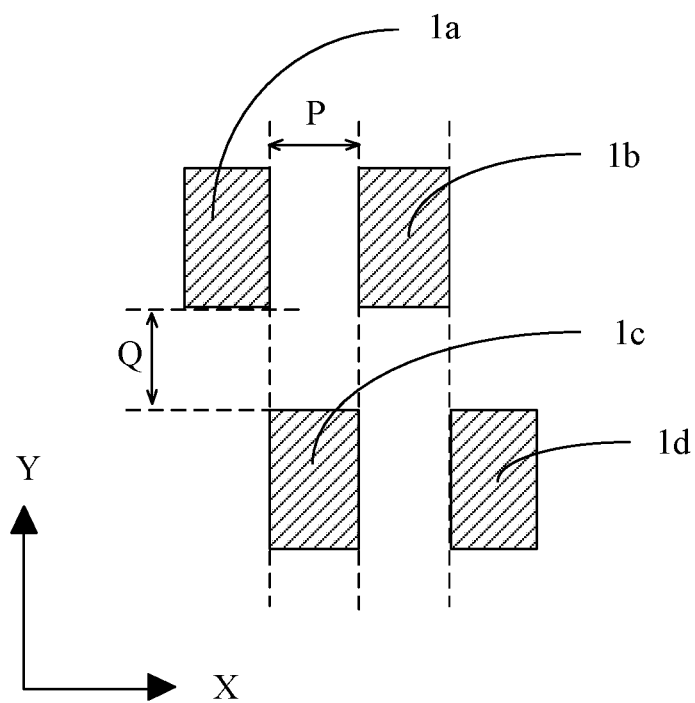
FIG. 4 is a schematic diagram of left-to-right close arrangement design for sub-pixels.

The sub-pixel adopts a left-to-right close arrangement design. As shown in FIG. 4, a width of each of a sub-pixel 1a, a sub-pixel 1b, a sub-pixel 1c and a sub-pixel 1d is 6.9 µm, the sub-pixel 1a and the sub-pixel 1b are at a same row, the sub-pixel 1c and the sub-pixel 1d are at a same row, and an interval P between adjacent two sub-pixels 1 at a same row along the first direction (X direction) is 6.9 µm, and an interval Q between any two rows of sub-pixels 1 along the second direction (Y direction) is 10 µm, both of the intervals Q and P are determined by existing process. Based on process and requirement, a width of a sub-pixel can be set as 5 µm-0.9 mm, and the interval Q can be adjusted as 2 µm-10 µm. In a pixel structure with such arrangement, the sub-pixel 1a, the sub-pixel 1c, the sub-pixel 1b and the sub-pixel 1d are sequentially left-to-right closely arranged along the first direction (X direction), so as to avoid occurrence of Moire pattern. Similarly, when a sub-pixel island is provided with three or more rows of sub-pixels, the occurrence of Moire pattern can also be avoided. For example, it can be configured that any row of sub-pixels satisfies: projections, along the second direction, of interval areas between adjacent sub-pixels in the sub-pixel row are occupied by projections, along the second direction, of sub-pixels in other sub-pixel rows, that is, the interval areas of the sub-pixel row can all be filled by sub-pixels in other sub-pixel rows, and correspondingly a Moire pattern deficiency can be avoided. Specifically, the filling may be in a form with overlaying, or in a form that the intervals between sub-pixels are exactly filled up.

Figure 5B:
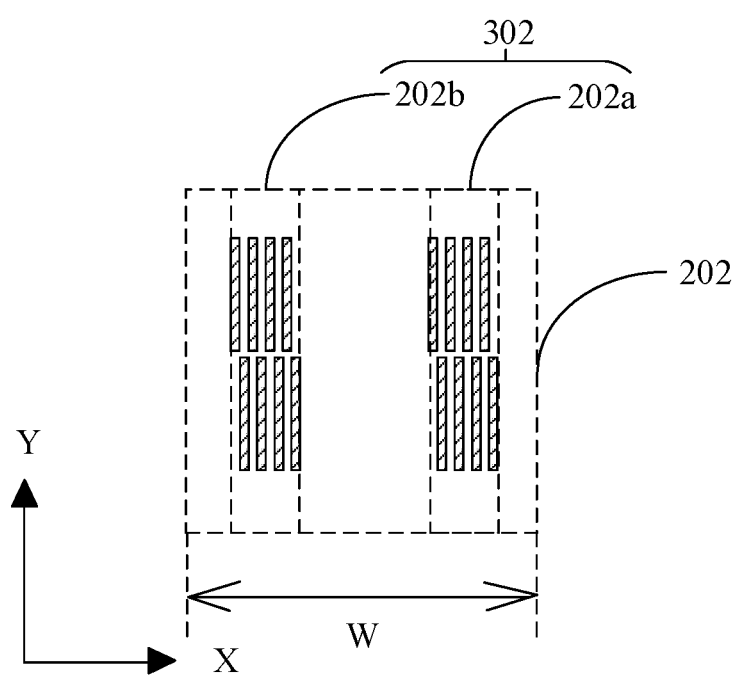
Figure 5C:
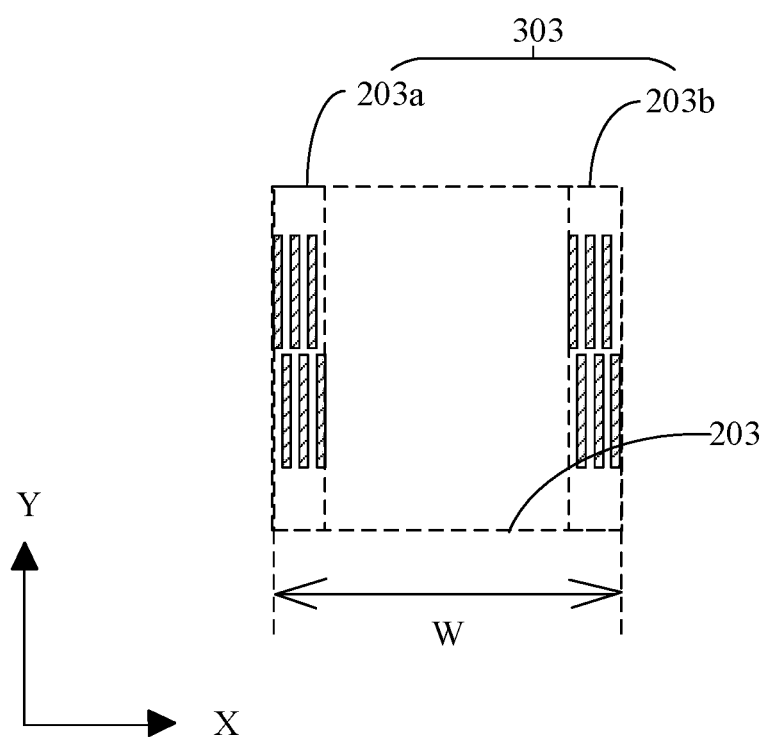

FIG. 5A, FIG. 5B and FIG. 5C are schematic pixel arrangement diagrams of 3 small pixel islands divided from the sub-pixel island in the embodiment of the 110-inch Mini LED display. FIG. 5A is a schematic design diagram of sub-pixels in a central small pixel island, FIG. 5B is a schematic design diagram of sub-pixels in a sub-central small pixel island, and FIG. 5C is a schematic design diagram of sub-pixels in a marginal small pixel island. As shown in the figure, the sub-pixel island is divided into a first small pixel island 201, a second small pixel island 202 and a third small pixel island 203. The first small pixel island 201, the second small pixel island 202 and the third small pixel island 203 all have a width W of 604.8 µm, and are all divided into two rows along the second direction (Y direction), and this is because a light-emitting efficiency reaches a maximum when the sub-pixel island is divided into two rows along the second direction (Y direction). Each of the first small pixel island 201, the second small pixel island 202 and the third small pixel island 203 is divided into pixel distributing areas and isolation areas.

The first small pixel island 201 corresponds to a first pixel group 301, and the first pixel group 301 is located at the pixel distributing area, and a part of the first small pixel island 201 except for the pixel distributing area constitutes the isolation area. The first pixel group 301 is located at a center of the first small pixel island 201 along the first direction (X direction), and includes 52 sub-pixels, and is divided into a first central small pixel group 201a and a second central small pixel group 201b, the first central small pixel group 201a and the second central small pixel group 201b are symmetrically distributed relative to a center of the first small pixel island 201 along the first direction (X direction), and each corresponds to 26 sub-pixels.

A distance between adjacent sub-pixels in the first central small pixel group 201a and the second central small pixel group 201b of the first small pixel island 201 is equal to a distance between the first central small pixel group 201a and the second central small pixel group 201b.

Each of the first central small pixel group 201a and the second central small pixel group 201b is divided into two rows along the second direction (Y direction), which are a first row of a central small pixel group and a second row of the central small pixel group, a number of sub-pixels in each row is 13, and widths of and distances between the sub-pixels in the first row of the central small pixel group and the second row of the central small pixel group correspondingly complement along the second direction (Y direction).

The second small pixel island 202 corresponds to a second pixel group 302, and the second pixel group 302 is located at the pixel distributing area, and a part of the second small pixel island 202 except for the pixel distributing area constitutes the isolation area. The second pixel group 302 is located at a sub-center of the second small pixel island 202 along the first direction (X direction), and includes 26 sub-pixels, and is divided into a first sub-central small pixel group 202a and a second sub-central small pixel group 202b, the first sub-central small pixel group 202a and the second sub-central small pixel group 202b are symmetrically distributed relative to a sub-center of the second small pixel island 202 along the first direction (X direction), and each corresponds to 13 sub-pixels.

Each of the first sub-central small pixel group 202a and the second sub-central small pixel group 202b is divided into two rows along the second direction (Y direction), which are a first row of a sub-central small pixel group and a second row of the sub-central small pixel group, a number of sub-pixels in one of the first row of the sub-central small pixel group and the second row of the sub-central small pixel group is odd while a number of sub-pixels in the other is even, and the odd and even number correspond to the number of sub-pixels in the first row of the central small pixel group and the second row of the central small pixel group, and widths of and distances between the sub-pixels in the first row of the sub-central small pixel group and the second row of the sub-central small pixel group correspondingly complement along the second direction (Y direction).

The third small pixel island 203 corresponds to a third pixel group 303, and the third pixel group 303 is located at the pixel distributing area, and a part of the third small pixel island 203 except for the pixel distributing area constitutes the isolation area. The third pixel group 303 is located at a margin of the third small pixel island 203 along the first direction (X direction), and includes 18 sub-pixels, and is divided into a first marginal small pixel group 203a and a second marginal small pixel group 203b, the first marginal small pixel group 203a and the second marginal small pixel group 203b are symmetrically distributed relative to a center of the third small pixel island 203 along the first direction (X direction), and each corresponds to 9 sub-pixels.

Each of the first marginal small pixel group 203a and the second marginal small pixel group 203b is divided into two rows along the second direction (Y direction), which are a first row of a marginal small pixel group and a second row of the marginal small pixel group, a number of sub-pixels in one of the first row of the marginal small pixel group and the second row of the marginal small pixel group is odd while a number of sub-pixels in the other is even, and the odd and even number correspond to the number of sub-pixels in the first row of the sub-central small pixel group and the second row of the sub-central small pixel group, and widths of and distances between the sub-pixels in the first row of the marginal small pixel group and the second row of the marginal small pixel group correspondingly complement along the second direction (Y direction).

FIG. 6 is a schematic structural design diagram of 3 small pixel islands divided from the sub-pixel island in the embodiment of the 110-inch Mini LED display. As shown in the figure, the pixel island 100 includes an R sub-pixel island 101, a G sub-pixel island 102 and a B sub-pixel island 103 along the second direction (Y direction) in sequence, and a length L and a width G of the pixel island 100 are both 1814.4 µm. Each of the R sub-pixel island 101, the G sub-pixel island 102 and the B sub-pixel island 103 is divided into a first small pixel island 201, a second small pixel island 202 and a third small pixel island 203 along the first direction (X direction). Correspondingly, the cylindrical lens 400 includes a first cylindrical lens 401, a second cylindrical lens 402 and a third cylindrical lens 403 along the first direction (X direction), a lens aperture of each of the first cylindrical lens 401, the second cylindrical lens 402 and the third cylindrical lens 403 is 82.79 µm.

Each of the first small pixel island 201, the second small pixel island 202 and the third small pixel island 203 is divided into pixel distributing areas and isolation areas, where respective pixel distributing areas are an area where the first pixel group 301, the second pixel group 302 or the third pixel group 303 is located, and the respective isolation areas is an area where no sub-pixel is set.

In the R sub-pixel island, the isolation area in the first small pixel island 201 can be correspondingly filled by the second pixel group 302 in the second small pixel island 202 and the third pixel group 303 in the third small pixel island 203. Similarly, the isolation area in the second small pixel island 202 can be correspondingly filled by the first pixel group 301 in the first small pixel island 201 and the third pixel group 303 in the third small pixel island 203. The isolation area in the third small pixel island 203 can be correspondingly filled by the first pixel group 301 in the first small pixel island 201 and the second pixel group 302 in the second small pixel island 202.

The first cylindrical lens 401 is located exactly above the first small pixel island 201, the second cylindrical lens 402 is located exactly above the second small pixel island 202, the third cylindrical lens 403 is located exactly above the third small pixel island 203.

Pixel arrangements in the first small pixel island 201, the second small pixel island 202 and the third small pixel island 203 are pixel arrangements in the first small pixel island 201, the second small pixel island 202 and the third small pixel island 203 as shown in FIG. 5A, FIG. 5B and FIG. 5C. The first small pixel island 201 corresponds to the first pixel group 301, the first pixel group 301 is located at a center of the first small pixel island 201, corresponding sub-pixels 1 are closest to the center, and thus the corresponding first cylindrical lens 401 has a minimum radius curvature R1, which is 0.28 mm, and a maximum arch height H1, which is 3.08 µm.

The second small pixel island 202 corresponds to the second pixel group 302, the second pixel group 302 is located at a sub-center of the second small pixel island 202, the corresponding second cylindrical lens 402 has a radius of curvature R2 of 0.34 mm, and an arch height H2 of 2.53 µm.

The third small pixel island 203 corresponds to the third pixel group 303, the third pixel group 303 is located at a margin of the third small pixel island 203, corresponding sub-pixels 1 are farthest to the center, and thus the corresponding third cylindrical lens 403 has a maximum radius curvature R3, which is 0.41 mm, and a minimum arch height H3, which is 2.10 µm.

A first central small pixel group 201a of the first small pixel island 201 forms a first central small island visual area 501a (not shown in FIG. 6) through the first cylindrical lens 401, by which a viewing angle of 0° to 24° in a single side can be achieved. A second central small pixel group 201b of the first small pixel island 201 forms a second central small island visual area 501b (not shown in FIG. 6) through the first cylindrical lens 401, by which a viewing angle of −24° to 0° in a single side can be achieved.

A first sub-central small pixel group 202a of the second small pixel island 202 forms a first sub-central small island visual area 502a (not shown in FIG. 6) through the second cylindrical lens 402, by which a viewing angle of −35° to −24° in a single side can be achieved. A second sub-central small pixel group 202b of the second small pixel island 202 forms a first sub-central small island visual area 502b (not shown in FIG. 6) through the second cylindrical lens 402, by which a viewing angle of 24° to 35° in a single side can be achieved.

A first marginal small pixel group 203a of the third small pixel island 203 forms a first marginal small island visual area 503a (not shown in FIG. 6) through the third cylindrical lens 403, by which a viewing angle of 35° to 44° in a single side can be achieved. A second marginal small pixel group 203b of the third small pixel island 203 forms a second marginal small island visual area 503b (not shown in FIG. 6) through the third cylindrical lens 403, by which a viewing angle of −44° to −35° in a single side can be achieved.

By setting the first small pixel island 201, the second small pixel island 202 and the third small pixel island 203 placed side-by-side along the first direction (X direction) as the R sub-pixel island 101, total of 96 (52+13+13+9+9) sub-pixels are set, and 96-viewpoint display is achieved, by which viewing angles 0° to 44° and −44° to 0° at a single side, or a viewing angle of −44° to 44° at both sides can be achieved, and displaying of a super large viewing angle is achieved.

Figure 7:
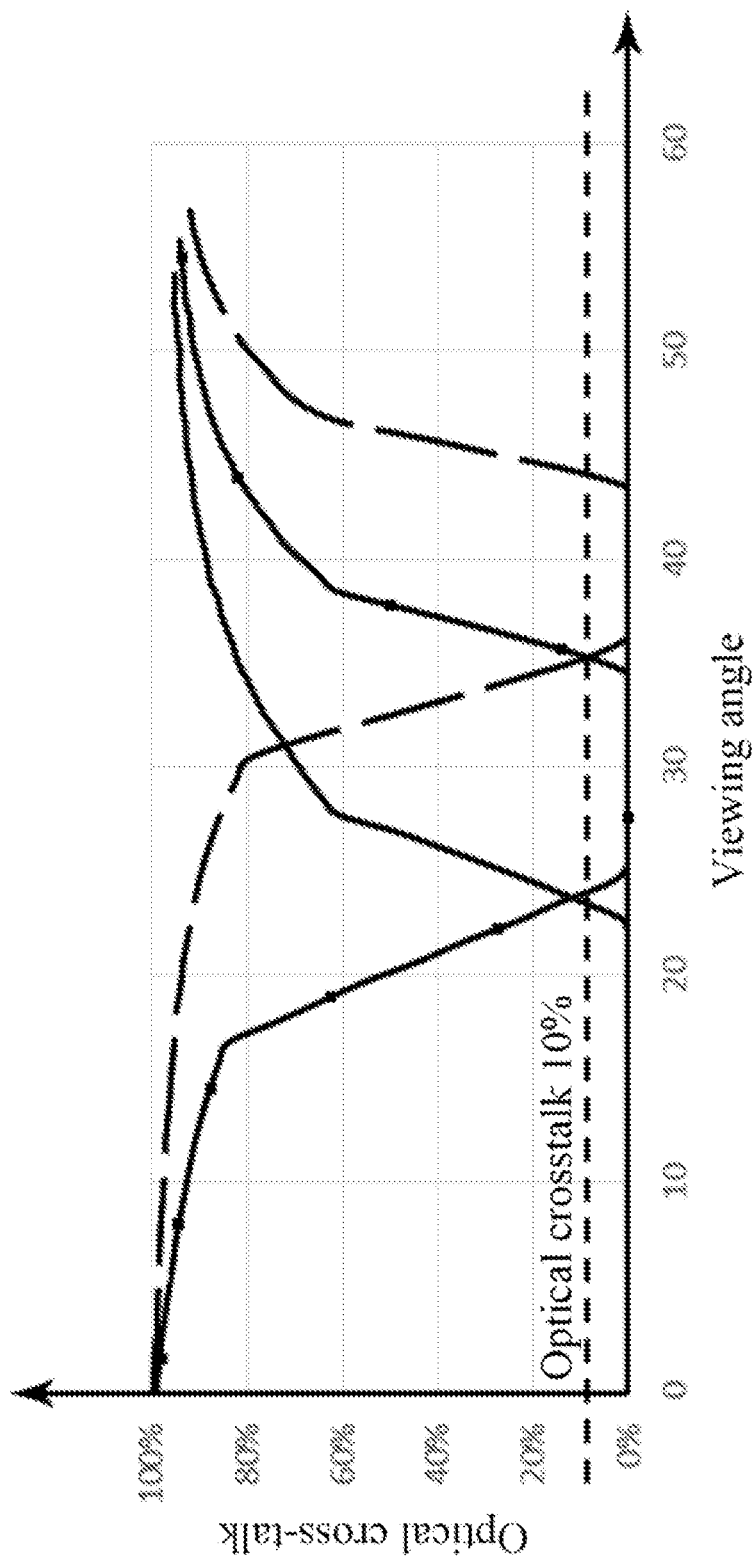
FIG. 7 is a simulation effect diagram of a pixel island designed by splicing small pixel islands according to an embodiment of the present disclosure.

FIG. 7 is a simulation effect diagram of a pixel island designed by splicing small pixel islands. The simulation is implemented by a software of Light tools. As shown in the figure, an adjacent optical crosstalk value between a single-side viewing angle 0° to 24° of the first cylindrical lens 401 and a single-side viewing angle 24° to 35° of the second cylindrical lens 402, and an adjacent optical crosstalk value between the single-side viewing angle 24° to 35° of the second cylindrical lens 402 and a single-side viewing angle 35° to 44° of the third cylindrical lens 403 are both below 10%.

Structural arrangements of the G sub-pixel island 102 and the B sub-pixel island 103 are both same as that of the R sub-pixel island 101.

Figure 8:
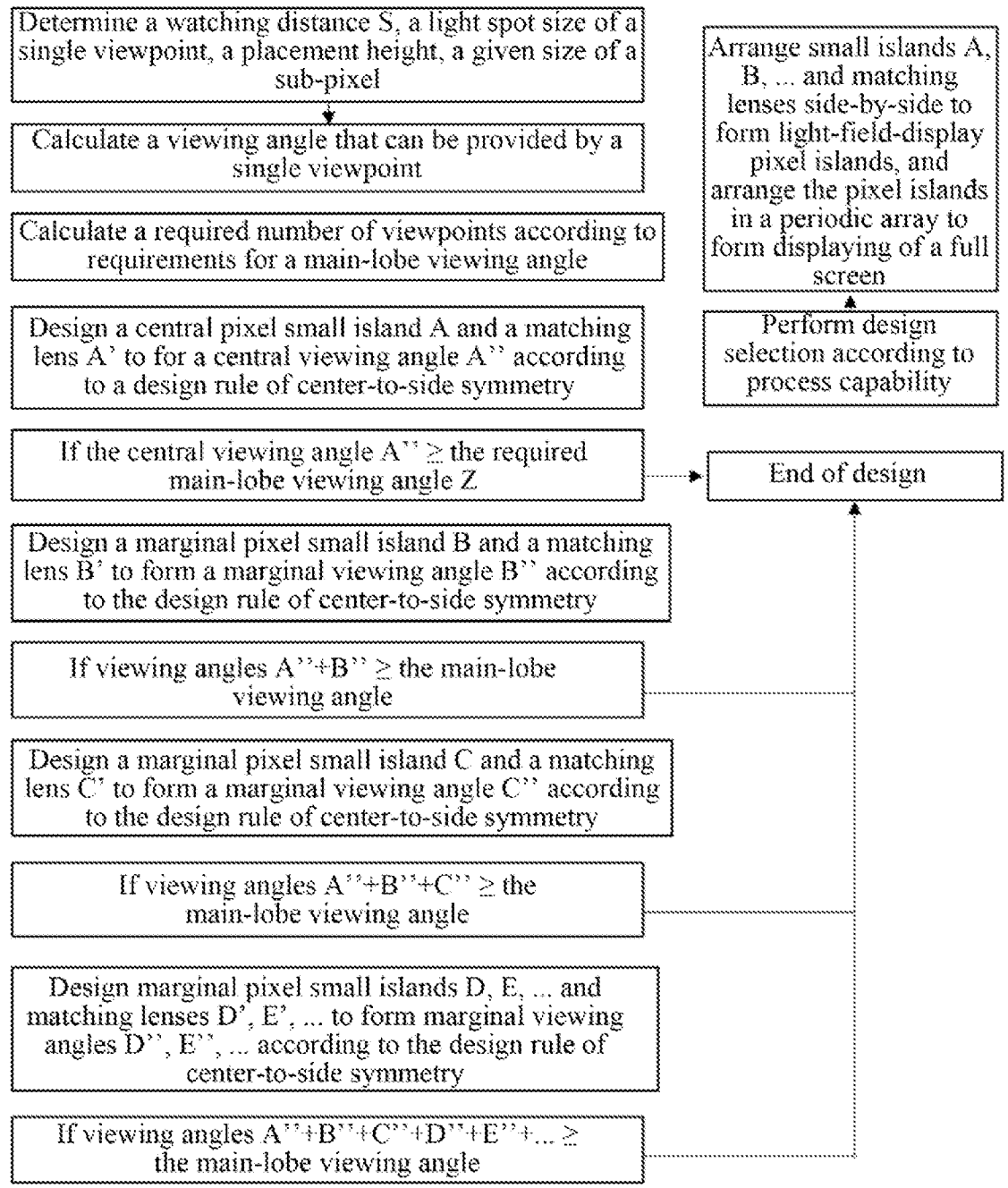
FIG. 8 is a flowchart of splicing design of a pixel island.

As can be understood, the splicing design of the pixel island can be applied to other display panels, and a design flow thereof is shown in FIG. 8.

First, determining a watching distance S, a light spot size of a single viewpoint, a placement height (of a cylindrical lens), a given size of a sub-pixel; second, calculating a viewing angle that can be provided by a single viewpoint, that is, single-point viewing angle θ; third, according to requirements for a main-lobe viewing angle Z, calculating a required number M of viewpoints; fourth, according to a design rule of center-to-side symmetry, designing a central pixel small island A and a matching lens A' to for a central viewing angle A"; fifth, if the central viewing angle A"≥the required main-lobe viewing angle Z, ending the design; sixth, performing design selection according to process capability; seventh, arranging small islands A and matching lenses A' side-by-side to form light-field-display pixel islands, and arranging the pixel islands in a periodic array to form displaying of a full screen.

The watching distance S is manually set. The light spot size of the single viewpoint is a light spot size formed by a sub-pixel passing through a corresponding cylindrical lens. To ensure that left and right eyes of a human can see different light spots to achieve 3D display effect, the light spot size is usually set as 1/N of a pupillary distance of human eyes (N=1, 2, 3, 4, 5, . . . ). The placement height is determined by the process capability.

Figure 9:
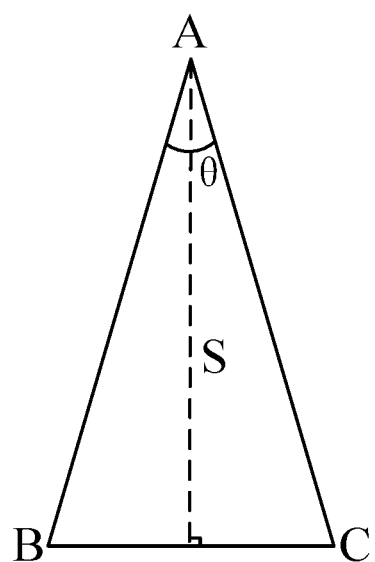
FIG. 9 is a triangular model diagram of a single-point viewing angle θ according to an embodiment of the present disclosure.

The single-point viewing angle θ is determined by a position of a sub-pixel, the light spot size of the single viewpoint and the watching distance S, as shown in FIG. 9. A position of a sub-pixel constitutes a vertex A of an isosceles triangle, the light spot size of the single viewpoint constitutes a base of the isosceles triangle, and vertexes of the base at two ends are B or C respectively, a height of the isosceles triangle is the watching distance S, and a vertex angle of the isosceles triangle is the single-point viewing angle θ.

The required number of viewpoints is determined by the main-lobe viewing angle Z and the single-point viewing angle θ, and the required number of viewpoints M=Z/θ.

If the central viewing angle A"≤the required main-lobe viewing angle Z, according to the design rule of center-to-side symmetry, a marginal pixel small island B and a matching lens B' are designed to form a marginal viewing angle B", and if viewing angles A"+B"≥the required main-lobe viewing angle Z, the design is ended.

After the design is ended, design selection is performed according to the process capability, and small islands A+B and matching lenses A'+B' are placed side-by-side to form light-field-display pixel islands, and the pixel islands are arranged in a periodic array to form displaying of a full screen.

If viewing angles A"+B"≤the required main-lobe viewing angle Z, according to the design rule of center-to-side symmetry, a marginal pixel small island C and a matching lens C' are designed to form a marginal viewing angle C", and if viewing angles A"+B"+C"≥the required main-lobe viewing angle Z, the design is ended.

After the design is ended, design selection is performed according to the process capability, and small islands A+B+C and matching lenses A'+B'+C' are placed side-by-side to form light-field-display pixel islands, and the pixel islands are arranged in a periodic array to form displaying of a full screen.

If viewing angles A"+B"+C"≤the required main-lobe viewing angle Z, according to the design rule of center-to-side symmetry, marginal pixel small islands D, E, F . . . and matching lenses D', E', F' . . . are designed to form marginal viewing angles D", E", F" . . . , and if viewing angles A"+B"+C"+D"+E"+F"+ . . . ≥the required main-lobe viewing angle Z, the design is ended.

After the design ends, design selection is performed according to the process capability, and small islands A+B+C+D+E+F+ . . . and matching lenses A'+B'+C'+D'+E'+F'+ . . . are placed side-by-side to form light-field-display pixel islands, and the pixel islands are arranged in a periodic array to form displaying of a full screen.

The present disclosure further provides a display apparatus, where the display apparatus includes the display panel described above. The display panel can be applied to a Mini LED display or a Micro LED display. In the embodiments of the present disclosure, the display panel is applied to a 110-inch Mini LED display.

Those skilled in the art can easily think of other embodiments after considering the disclosure of the specification and embodiments. The embodiments can be implemented in various forms and should not be limited to the scope of description. The described features, structures or characteristics can be combined in one or more embodiments in any suitable way. The true scope and spirit of the present disclosure is indicated by the claims.

The invention claimed is:

1. A display panel, wherein the display panel comprises a pixel array layer and a lens array layer arranged in a stacked manner, the pixel array layer comprises sub-pixel islands, the sub-pixel island comprises a first pixel island and a second pixel island arranged along a first direction in sequence, and each of the first pixel island and the second pixel island comprises at least two pixel groups;

the lens array layer comprises a first cylindrical lens and a second cylindrical lens arranged along the first direction, the first cylindrical lens corresponds to the first pixel island, and the second cylindrical lens corresponds to the second pixel island;

a distance between two pixel groups in the first pixel island is smaller than a distance between two pixel groups in the second pixel island, a focal length of the first cylindrical lens is smaller than a focal length of the second cylindrical lens, the first cylindrical lens is arranged near a center of the first pixel island along the first direction, the two pixel groups in the first pixel island form a first visual area through the first cylindrical lens; the second cylindrical lens is arranged near a center of the second pixel island along the first direction, the two pixel groups in the second pixel island form a second visual area through the second cylindrical lens, the second visual area comprises two parts corresponding to the two pixel groups in the second pixel island respectively, the two parts of the second visual area are located at different sides of the first visual area along the first direction respectively.

2. The display panel according to claim 1, wherein each of the first pixel island and the second pixel island comprises two pixel groups, the two pixel groups of the first pixel island are symmetrically distributed relative to a center of the first pixel island along the first direction, and the two pixel groups of the second pixel island are symmetrically distributed relative to a center of the second pixel island along the first direction.

3. The display panel according to claim 1, wherein the sub-pixel island further comprises a third pixel island, the third pixel island comprises two pixel groups, and the first pixel island, the second pixel island and the third pixel island are arranged along the first direction in sequence;

the lens array layer further comprises a third cylindrical lens, the third cylindrical lens corresponds to the third pixel island, and the first cylindrical lens, the second cylindrical lens and the third cylindrical lens are arranged along the first direction in sequence;

the distance between the two pixel groups in the second pixel island is smaller than a distance between two pixel groups in the third pixel island, the focal length of the second cylindrical lens is smaller than a focal length of the third cylindrical lens, the third cylindrical lens is arranged near a center of the third pixel island along the first direction, the two pixel groups in the third pixel island form a third visual area through the third cylindrical lens, the third visual area comprises two parts corresponding to the two pixel groups in the third pixel island respectively, and the two parts of the third visual area are located at different sides of the second visual area along the first direction respectively.

4. The display panel according to claim 3, wherein the first cylindrical lens, the second cylindrical lens and the third cylindrical lens share a same material, a radius of curvature of the first cylindrical lens is smaller than a radius of curvature of the second cylindrical lens, and the radius of curvature of the second cylindrical lens is smaller than a radius of curvature of the third cylindrical lens.

5. The display panel according to claim 3, wherein an arch height H1 of the first cylindrical lens, an arch height H2 of the second cylindrical lens, and an arch height H3 of the third cylindrical lens satisfy: H1>H2>H3.

6. The display panel according to claim 3, wherein the first cylindrical lens, the second cylindrical lens and the third cylindrical lens have a same lens aperture.

7. The display panel according to claim 3, wherein an optical crosstalk between adjacent viewpoints of the first pixel island, the second pixel island and the third pixel island ≤10%.

8. The display panel according to claim 1, wherein the pixel array layer comprises the sub-pixel islands arranged along a second direction, the sub-pixel islands comprise an R sub-pixel island for emitting red light, a G sub-pixel island for emitting green light, and a B sub-pixel island for emitting blue light; sub-pixels in a sub-pixel island emit light of a same color.

9. The display panel according to claim 8, wherein each of the R sub-pixel island, the G sub-pixel island and the B sub-pixel island comprises at least two pixel rows along the second direction, and interval areas are set between adjacent sub-pixels in each of the sub-pixel rows;
  in a sub-pixel island, the interval areas in a sub-pixel row are correspondingly filled by sub-pixels of other sub-pixel rows.

10. The display panel according to claim 9, wherein in a sub-pixel island, a distance between adjacent sub-pixel rows along the second direction is 2 μm-10 μm.

11. The display panel according to claim 1, wherein each of the first pixel island and the second pixel island comprises pixel distributing areas and isolation areas, and no sub-pixel is set within the isolation areas;
  in a sub-pixel island, respective isolation areas in the first pixel island are correspondingly filled by respective pixel distributing areas in the second pixel island, and respective isolation areas in the second pixel island are correspondingly filled by respective pixel distributing areas in the first pixel island.

12. The display panel according to claim 1, wherein a distance between adjacent sub-pixels in the respective pixel groups in the first pixel island is equal to a distance between the two pixel groups in the first pixel island.

13. The display panel according to claim 12, wherein the two pixel groups in the first pixel island are arranged at a center of the first pixel island along the first direction.

14. The display panel according to claim 1, wherein a distance between adjacent sub-pixels in the respective pixel groups in the second pixel island is equal to a distance between the two pixel groups in the second pixel island.

15. The display panel according to claim 1, wherein for each of the pixel groups, a width of respective sub-pixel in the pixel group ranges from 5 μm to 0.9 mm.

16. A display apparatus, wherein the display apparatus comprises the display panel according to claim 1.

* * * * *